(12) United States Patent
Tomioka et al.

(10) Patent No.: US 9,116,334 B2
(45) Date of Patent: Aug. 25, 2015

(54) VARIABLE MAGNIFICATION OPTICAL SYSTEM AND IMAGING APPARATUS

(71) Applicant: FUJIFILM Corporation, Tokyo (JP)

(72) Inventors: Ukyo Tomioka, Saitama-ken (JP); Michio Cho, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 45 days.

(21) Appl. No.: 14/193,907

(22) Filed: Feb. 28, 2014

(65) Prior Publication Data
US 2014/0177068 A1    Jun. 26, 2014

Related U.S. Application Data

(63) Continuation of application No. PCT/JP2012/005509, filed on Aug. 31, 2012.

(30) Foreign Application Priority Data

Sep. 14, 2011  (JP) .................. 2011-200597

(51) Int. Cl.
*G02B 15/14*   (2006.01)
*G02B 13/18*   (2006.01)
*G02B 15/173*  (2006.01)

(52) U.S. Cl.
CPC ............... *G02B 15/14* (2013.01); *G02B 13/18* (2013.01); *G02B 15/173* (2013.01)

(58) Field of Classification Search
CPC .. G02B 15/177; G02B 15/14; G02B 13/0045; G02B 13/009
USPC ................................. 359/676–706
See application file for complete search history.

(56) References Cited

U.S. PATENT DOCUMENTS

| 4,025,167 | A  | 5/1977  | Ikeda   |
|-----------|----|---------|---------|
| 7,450,315 | B2 | 11/2008 | Tomioka |
| 2007/0279762 | A1 | 12/2007 | Tomioka |

FOREIGN PATENT DOCUMENTS

| JP | 50-109739   | 8/1975  |
|----|-------------|---------|
| JP | 2007-328006 | 12/2007 |
| JP | 2009-237400 | 10/2009 |

OTHER PUBLICATIONS

International Search Report, PCT/JP2012/005509, Dec. 25, 2012.

*Primary Examiner* — Mahidere Sahle
(74) *Attorney, Agent, or Firm* — Young & Thompson

(57) ABSTRACT

A variable magnification optical system consists of a positive first lens-group, a negative second lens-group, a positive third lens-group and a positive fourth lens-group in this order from an object side. The first lens-group and the third lens-group are fixed when magnification is changed from a wide-angle end to a telephoto end, and the magnification is changed from the wide-angle end to the telephoto end by moving the second lens-group toward an image side, and correction of an image plane and focusing, which have been necessitated by magnification change, are performed by moving the fourth lens-group. The first lens-group consists of two positive lenses and a negative lens in this order from the object side. The second lens-group consists of a negative 21st lens, a positive 22nd lens, a negative 23rd lens and a negative 24th lens in this order from the object side.

16 Claims, 9 Drawing Sheets

EXAMPLE 1

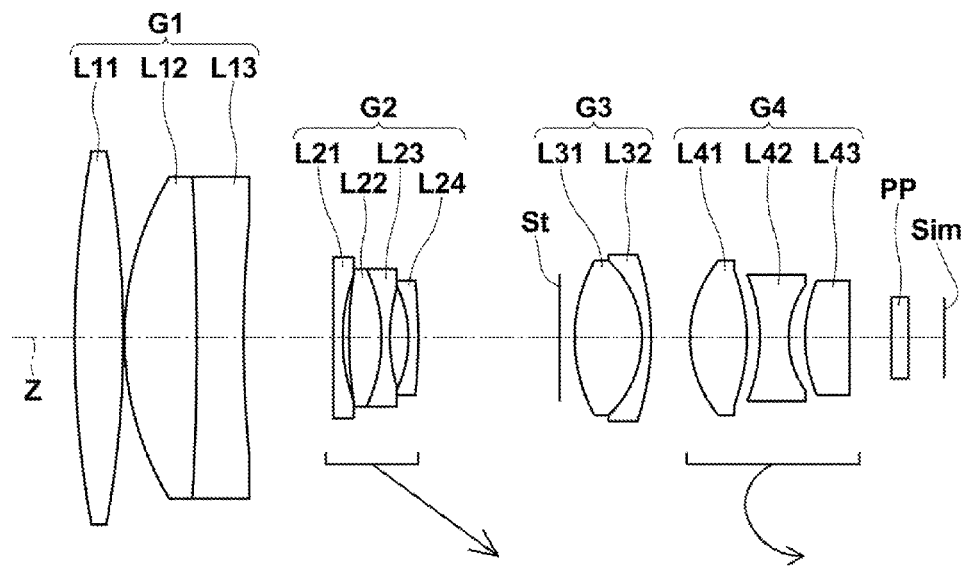
EXAMPLE 1 FIG.1
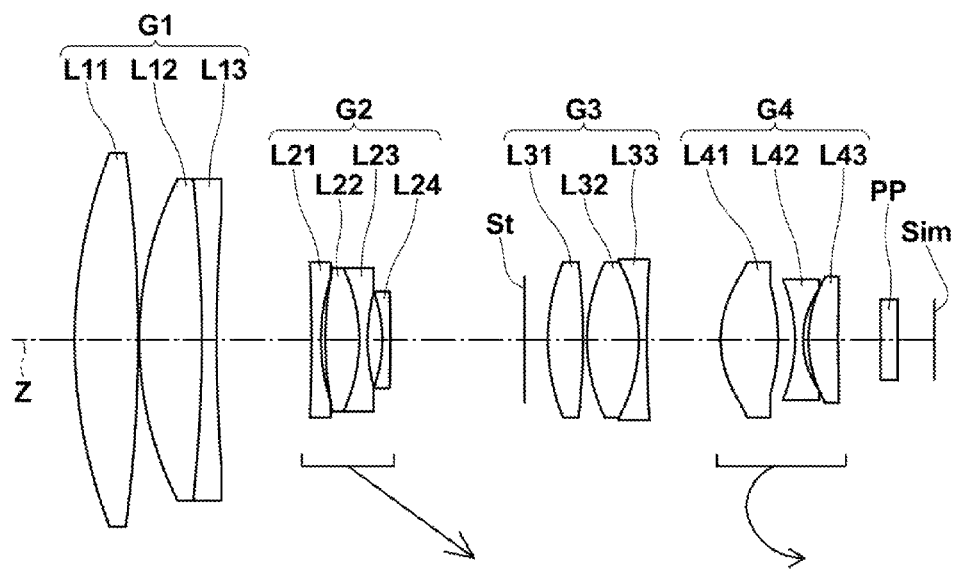
EXAMPLE 2 FIG.2

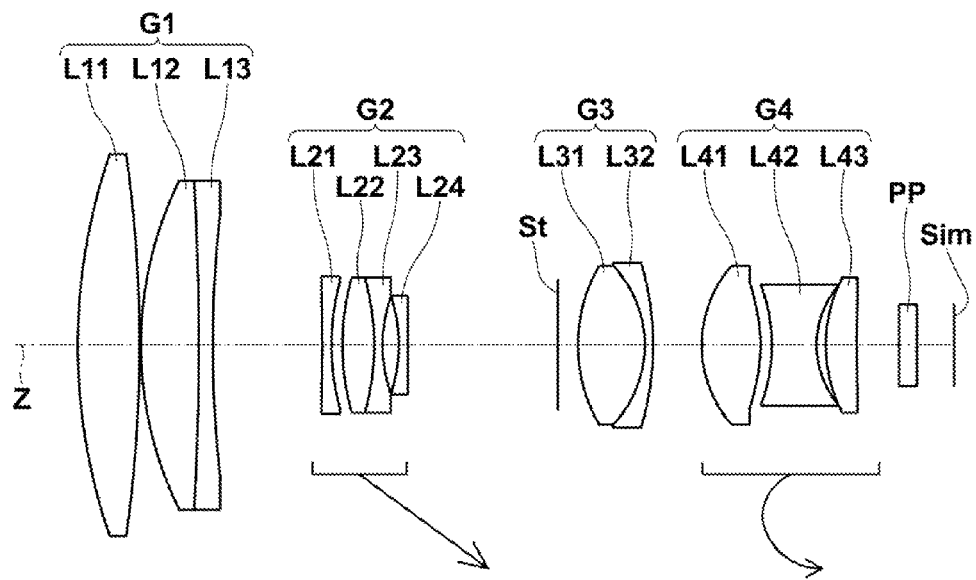
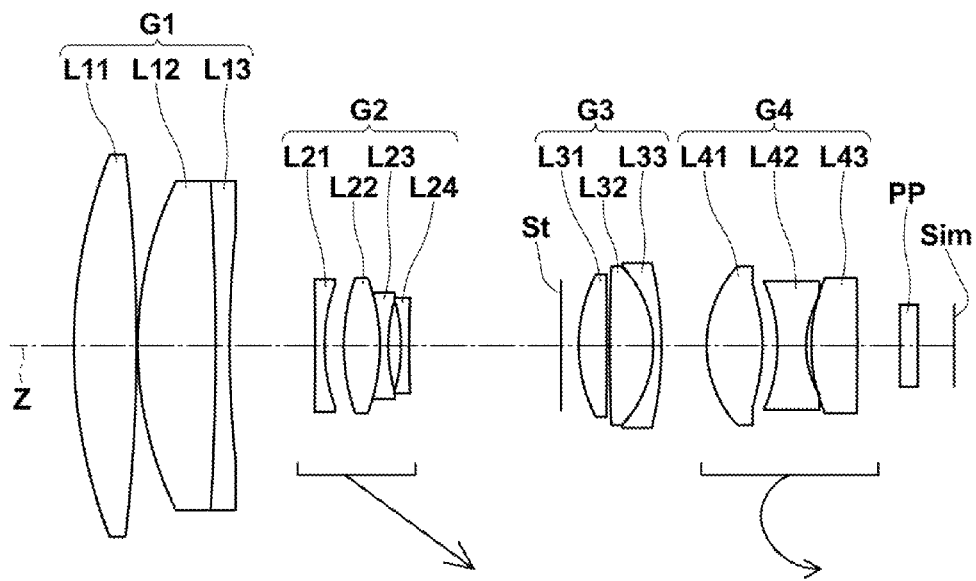

VARIABLE MAGNIFICATION OPTICAL SYSTEM AND IMAGING APPARATUS

CROSS REFERENCE TO RELATED APPLICATIONS

This application is a continuation of PCT/JP2012/005509 filed on Aug. 31, 2012, which claims foreign priority to Japanese Application No. 2011-200597 filed on Sep. 14, 2011. The entire contents of each of the above applications are hereby incorporated by reference.

BACKGROUND OF THE INVENTION

1. Field of the Invention

The present invention relates to a variable magnification optical system usable in a video camera, an electronic still camera, and the like, and to an imaging apparatus. In particular, the present invention relates to a variable magnification optical system appropriate for a surveillance camera, and which is usable in a wide wavelength band from a visible range through a near-infrared range, and to an imaging apparatus including the variable magnification optical system.

2. Description of the Related Art

Conventionally, surveillance cameras were used to prevent crime, to record and the like. An optical system for such a surveillance camera needs to be structurable in small size and at low cost. Further, the optical system needs to have a large relative aperture to identify a subject even in low illumination photography conditions, and to have a high variable magnification ratio and high optical performance.

Optical systems for surveillance cameras have been proposed, for example, in U.S. Pat. No. 7,450,315 (Patent Document 1) and Japanese Unexamined Patent Publication No. 2009-237400 (Patent Document 2). In both of the optical systems disclosed in Patent Documents 1 and 2, the optical system consists of a first lens group having positive refractive power, a second lens group having negative refractive power, a third lens group having positive refractive power, and a fourth lens group having positive refractive power in this order from an object side. The first lens group and the third lens group are fixed and the second lens group and the fourth lens group move during magnification change. The first lens group consists of three lenses, which are a positive lens, a positive lens and a negative lens arranged in this order from the object side.

SUMMARY OF THE INVENTION

In recent years, a need for images with higher image qualities has increased also for surveillance cameras. Especially, a demand for a variable magnification optical system that can cope with a camera including an imaging device of one million pixels or higher is increasing. Meanwhile, an optical system for a surveillance camera for both day and night use is often set in unattended facilities, and photography by visible light is performed during day time, and photography by near-infrared light is performed during night time. Therefore, chromatic aberrations need to be excellently corrected in a wide wavelength band from a visible range through a near-infrared range, and high optical performance needs to be maintained. In recent years, an optical system that can satisfy these two demands is requested.

Meanwhile, the optical system disclosed in Patent Document 1 tried to cope with a visible range through a near-infrared range. However, in some cases, higher resolution performance was needed depending on the specification of an apparatus the resolution of which became higher in recent years. The optical system disclosed in Patent Document 2 can cope with higher resolution. However, only visible range was assumed.

In view of the foregoing circumstances, it is an object of the present invention to provide a variable magnification optical system that can be used in a wide wavelength band from a visible range through a near-infrared range and that has high optical performance for coping with a high resolution imaging device, while the small size of the optical system and a large relative aperture are maintained. Further, it is another object of the present invention to provide an imaging apparatus including the variable magnification optical system.

A variable magnification optical system of the present invention is a variable magnification optical system substantially consisting of four lens groups of a first lens group having positive refractive power, a second lens group having negative refractive power, a third lens group having positive refractive power and a fourth lens group having positive refractive power in this order from an object side, wherein the first lens group and the third lens group are fixed with respect to the direction of an optical axis when magnification is changed from a wide-angle end to a telephoto end, and the magnification is changed from the wide-angle end to the telephoto end by moving the second lens group along the optical axis toward an image side, and correction of an image plane and focusing, which have been necessitated by magnification change, are performed by moving the fourth lens group along the optical axis, and wherein the first lens group substantially consists of three lenses of a lens having positive refractive power, a lens having positive refractive power and a lens having negative refractive power in this order from the object side, and wherein the second lens group substantially consists of four lenses of a 21st lens having negative refractive power, a 22nd lens having positive refractive power, a 23rd lens having negative refractive power and a 24th lens having negative refractive power in this order from the object side.

In the variable magnification optical system of the present invention, it is desirable that an image-side surface of the 22nd lens is convex, and that an object-side surface of the 23rd lens is concave.

In the variable magnification optical system of the present invention, it is desirable that the 22nd lens and the 23rd lens are cemented together. When the 22nd lens and the 23rd lens are cemented together, it is desirable that the following conditional formula (1) is satisfied:

$$-2.0 < Rc/fw < -0.6 \quad (1), \text{where}$$

Rc: a curvature radius of a cemented surface of the 22nd lens and the 23rd lens, and fw: a focal length of an entire system at the wide-angle end.

Further, in the variable magnification optical system of the present invention, it is desirable that the following conditional formulas (2) and (3) are satisfied:

$$70.0 < v1p \quad (2),$$

and $$34.0 < v2n < 40.0 \quad (3), \text{where}$$

v1 p: an average of Abbe numbers of the positive lenses included in the first lens group for d-line, and v2 n: an average of Abbe numbers of the negative lenses included in the second lens group for d-line.

Further, in the variable magnification optical system of the present invention, it is desirable that the 24th lens is a meniscus lens with a concave surface facing the object side.

Further, in the variable magnification optical system of the present invention, it is desirable that the 22nd lens is a biconvex lens, and that the 23rd lens is a biconcave lens.

In the variable magnification optical system of the present invention, it is desirable that the following conditional formula (4) is satisfied:

$$0.50<(R21f+R21r)/(R21f-R21r)<1.30 \quad (4),\text{ where}$$

R21 f: a curvature radius of an object-side surface of the 21st lens, and

R21 r: a curvature radius of an image-side surface of the 21st lens.

In the variable magnification optical system of the present invention, it is desirable that the fourth lens group substantially consists of three lenses of a 41st lens having positive refractive power, a 42nd lens having negative refractive power and a 43rd lens having positive refractive in this order from the object side, and that the 41st lens has at least one aspherical surface.

In the variable magnification optical system of the present invention, it is desirable that the third lens group includes a lens having positive refractive power and a cemented lens of a lens having positive refractive power and a lens having negative refractive power.

Further, the term "substantially" in the expression "substantially consisting of four lens groups", the expression "substantially consists of three lenses", and the expression "substantially consists of four lenses" means that lenses substantially without any refractive power, optical elements other than lenses, such as a stop and a cover glass, mechanical components, such as a lens flange, a lens barrel, an imaging device, and a hand shake blur correction mechanism, and the like may be included in addition to lens groups or lenses mentioned as composition elements.

Further, the term "lens group" does not necessarily represent a lens group consisting of plural lenses. The lens group may consist of only one lens. Further, the variable magnification optical system of the present invention may be a zoom lens or a varifocal lens.

In the variable magnification optical system of the present invention, the surface shape of a lens and the sign of the refractive power of a lens are considered in a paraxial region when the lens includes an aspherical surface. Further, the sign of a curvature radius is positive when a surface shape is convex toward an object side, and negative when a surface shape is convex toward an image side.

An imaging apparatus according to the present invention includes a variable magnification optical system of the present invention, as described above, and an imaging device that images an image of a subject formed by the variable magnification optical system.

A variable magnification optical system of the present invention consists of a positive first lens group, which is fixed during magnification change, a negative second lens group, a positive third lens group, which is fixed during magnification change, and a positive fourth lens group in this order from an object side. When magnification is changed from a wide-angle end to a telephoto end, the second lens group is moved toward an image side, and correction of an image plane and focusing, which have been necessitated by magnification change, are performed by moving the fourth lens group. In a lens system structured in such a manner, the lens structure of the first lens group and the second lens group are appropriately set in detail. Therefore, it is possible to achieve excellent correction of chromatic aberrations for a wide wavelength band from a visible range through a near-infrared range, and high optical performance that can cope with a high resolution imaging device, while the small size of the optical system and a large relative aperture are maintained.

An imaging apparatus of the present invention includes a variable magnification optical system of the present invention. Therefore, the imaging apparatus is structurable in small size. Further, the imaging apparatus can cope with low illumination conditions and a wide wavelength band from a visible range through a near-infrared range. The imaging apparatus can obtain images with high image qualities.

BRIEF DESCRIPTION OF THE DRAWINGS

FIG. 1 is a cross section illustrating the lens structure of a variable magnification optical system in Example 1 of the present invention;

FIG. 2 is a cross section illustrating the lens structure of a variable magnification optical system in Example 2 of the present invention;

FIG. 3 is a cross section illustrating the lens structure of a variable magnification optical system in Example 3 of the present invention;

FIG. 4 is a cross section illustrating the lens structure of a variable magnification optical system in Example 4 of the present invention;

DESCRIPTION OF THE PREFERRED EMBODIMENTS

Figure 5:
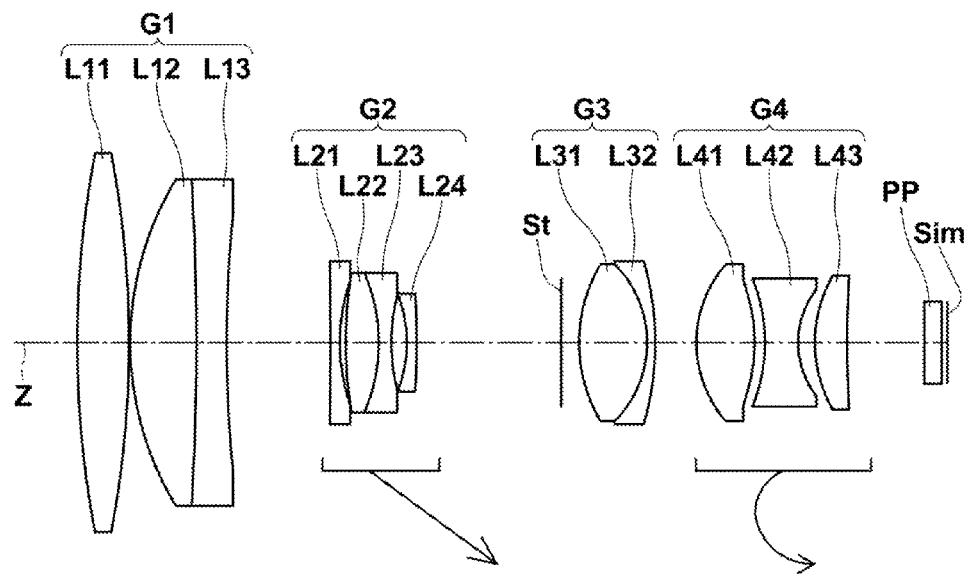
FIG. 5 is a cross section illustrating the lens structure of a variable magnification optical system in Example 5 of the present invention.

Next, embodiments of the present invention will be described in detail with reference to drawings. FIG. 1 is a cross section illustrating an example of the structure of a variable magnification optical system according to an embodiment of the present invention. FIG. 1 corresponds to a variable magnification optical system in Example 1, which will be described later. FIG. 2 through FIG. 5 are cross sections illustrating other structure examples according to the embodiments of the present invention. FIG. 2 through FIG. 5 correspond to variable magnification optical systems in Examples 2 through 5, respectively, which will be described later. The basic structure illustrated in FIG. 1 through FIG. 5 is similar to each other, and an illustration method is also similar. Therefore, a variable magnification optical system according to an embodiment of the present invention will be described mainly with reference to FIG. 1.

This variable magnification optical system substantially consists of four lens groups of first lens group G1 having positive refractive power, second lens group G2 having negative refractive power, third lens group G3 having positive refractive power and fourth lens group G4 having positive refractive power in this order from an object side. When magnification is changed from a wide-angle end to a telephoto end, first lens group G1 and third lens group G3 are fixed with respect to the direction of an optical axis, and the magnification is changed from the wide-angle end to the telephoto end by moving second lens group G2 along optical axis Z toward an image side, and correction of an image plane and focusing, which have been necessitated by magnification change, are performed by moving fourth lens group G4 along optical axis Z.

The lens structure illustrated in FIG. 1 shows arrangement of lenses when the optical system is focused on an object at infinity at a wide-angle end. Arrows under second lens group G2 and fourth lens group G4 schematically illustrate paths of movement of second lens group G2 and fourth lens group G4, respectively, when magnification is changed from a wide-angle end to a telephoto end. In FIG. 1, the left side is an object side, and the right side is an image side.

In the example illustrated in FIG. 1, aperture stop St is arranged between second lens group G2 and third lens group G3. Aperture stop St is fixed with respect to image plane Sim during magnification change. Here, aperture stop St illustrated in FIG. 1 does not necessarily represent the size nor the shape of aperture stop St, but the position of aperture stop St on optical axis Z.

When the variable magnification optical system is mounted on an imaging apparatus, it is desirable that the imaging apparatus is structured in such a manner that a cover glass for protecting an imaging surface of an imaging device, a prism, such as a color separation prism, based on the specification of the imaging apparatus, and various filters, such as a low-pass filter and an infrared ray cut filter, are appropriately provided. FIG. 1 illustrates an example in which parallel-flat-plate-shaped optical member PP, which is assumed to be these elements, is arranged between a most image-side lens group and image plane Sim.

As illustrated in FIG. 1, first lens group G1 consists of three lenses, which are 11th lens L11 having positive refractive power, 12th lens L12 having positive refractive power and 13th lens L13 having negative refractive power in this order from the object side. The power arrangement of first lens group G1, in which positive refractive power, positive refractive power and negative refractive power are arranged in this order from the object side, is advantageous to reduction in the total length of the optical system, compared with power arrangement in which negative refractive power, positive refractive power and positive refractive power are arranged.

As detailed lens structure of first lens group G1, for example, 11th lens L11 may be a biconvex lens, 12th lens L12 may be a biconvex lens, and 13th lens L13 may be a biconcave lens. Further, 12th lens L12 and 13th lens L13 may be cemented together to constitute a cemented lens. When 12th lens L12 and 13th lens L13 are a cemented lens, that can contribute to reduction in size of the optical system by eliminating an air space between 12th lens L12 and 13th lens L13. Further, it is possible to reduce a deterioration of performance caused by an error in assembly.

As illustrated in FIG. 1, second lens group G2 consists of four lenses of 21st lens L21 having negative refractive power, 22nd lens L22 having positive refractive power, 23rd lens L23 having negative refractive power and 24th lens L24 having negative refractive power in this order from the object side.

When negative 21st lens L21 and positive 22nd lens L22 are arranged in this order from the object side in second lens group G2, it is possible to excellently correct a lateral chromatic aberration especially on the wide-angle side. Further, when positive 22nd lens L22 and negative 23rd lens L23 are arranged as a second lens and a third lens from the object side in second lens group G2, it is possible to excellently correct a longitudinal chromatic aberration especially on the telephoto side. Further, when negative 24th lens L24 is arranged on the image side of negative 23rd lens L23, it is possible to excellently correct a spherical aberration, which tends to be overcorrected at a middle magnification ratio.

In second lens group G2, it is desirable that an image-side surface of 22nd lens L22 is convex, and that an object-side surface of 23rd lens L23 is concave. When the surfaces have such shapes, it is possible to easily correct chromatic aberrations in an excellent manner while maintaining the absolute value of a curvature radius of the image-side surface of 22nd lens L22 and the absolute value of a curvature radius of the object-side surface of 23rd lens L23 at appropriate values.

Further, it is desirable that 22nd lens L22 is a biconvex lens, and that 23rd lens L23 is a biconcave. Such shapes of the lenses can suppress a fluctuation of a lateral chromatic aberration caused by magnification change.

It is desirable that 22nd lens L22 and 23rd lens L23 are cemented together. When 22nd lens L22 and 23rd lens L23 are cemented together, it is possible to excellently correct chromatic aberrations, and to secure excellent optical performance for a wide wavelength band from a visible range through a near-infrared range. Further, it is possible to reduce a deterioration of performance caused by an error in assembly.

When 22nd lens L22 and 23rd lens L23 are cemented together, it is desirable that the following conditional formula (1) is satisfied:

$$-2.0 < Rc/fw < -0.6 \qquad (1),$$ where

Rc: a curvature radius of a cemented surface of 22nd lens L22 and 23rd lens L23, and fw: a focal length of an entire system at the wide-angle end.

If the value is lower than the lower limit of conditional formula (1), a longitudinal chromatic aberration for blue is overcorrected especially on the telephoto side. If the value exceeds the upper limit of conditional formula (1), the longitudinal chromatic aberration for blue is undercorrected on the telephoto side. When conditional formula (1) is satisfied, it is possible to excellently correct a longitudinal chromatic aberration on the telephoto side.

It is more desirable that the following conditional formula (1') is satisfied instead of conditional formula (1) to further enhance the effect achievable by satisfying conditional formula (1):

$$-1.7 < Rc/fw < -0.8 \qquad (1').$$

It is desirable that 24th lens L24 is a meniscus lens with a concave surface facing the object side. This can suppress generation of a spherical aberration for a short wavelength on the telephoto side.

For example, third lens group G3 may consist of two lenses of 31st lens L31 having positive refractive power and 32nd lens having negative refractive power in this order from the object side, as illustrated in FIG. 1. In such two lens structure, it is desirable that positive 31st lens L31 and negative 32nd lens are cemented together. When positive 31st lens L31 and negative 32nd lens are cemented together, it is possible to excellently correct chromatic aberrations for a wide wavelength band from a visible range through a near-infrared range. Further, it is possible to reduce a deterioration of performance caused by an error in assembly.

Alternatively, third lens group G3 may consist of three or more lenses including a lens having positive refractive power and a cemented lens in which a lens having positive refractive power and a lens having negative refractive power are cemented together. When third lens group G3 includes a cemented lens, it is possible to excellently correct chromatic aberrations for a wide wavelength band from a visible range through a near-infrared range. Further, it is possible to reduce a deterioration of performance caused by an error in assembly.

For example, when third lens group G3 consists of three lenses, the structure is advantageous to correction of aberrations, compared with two lens structure. Especially, it is possible to more excellently correct a spherical aberration generated in third lens group G3. When an optical system with higher specification, such as a wider angle and a higher variable magnification ratio, is needed, it is desirable that third lens group G3 consists of three lenses.

When third lens group G3 consists of three lenses, as described above, it is desirable that 31st lens L31 having positive refractive power, 32nd lens L32 having positive refractive power and 33rd lens L33 having negative refractive power are arranged in this order from the object side, for example, as illustrated in FIG. 2 and FIG. 4. When the lenses are arranged in this manner, it is possible to more excellently correct a spherical aberration generated in third lens group G3.

For example, fourth lens group G4 may consist of three lenses of 41st lens L41 having positive refractive power, 42nd lens L42 having negative refractive power and 43rd lens L43 having positive refractive power in this order from the object side, as illustrated in FIG. 1. Such power arrangement of fourth lens group G4 is advantageous to excellent correction of curvature of field.

Further, 41st lens L41, which is arranged on the most object side in fourth lens group G4, may be an aspheric lens. In such a case, it is possible to easily achieve a small F-number and high optical performance, while securing compactness.

It is desirable that a variable magnification optical system according to an embodiment of the present invention satisfies the following conditional formulas (2) and (3):

$$70.0 < v1p \quad (2);$$

and $$34.0 < v2n < 40.0 \quad (3), \text{where}$$

v1 p: an average of Abbe numbers of positive lenses included in first lens group G1 for d-line, and v2 n: an average of Abbe numbers of negative lenses included in second lens group G2 for d-line.

If the value is lower than the lower limit of conditional formula (2), a longitudinal chromatic aberration is undercorrected especially on the telephoto side. When conditional formula (2) is satisfied, it is possible to excellently correct a longitudinal chromatic aberration on the telephoto side. It is desirable that conditional formula (2') is satisfied instead of conditional formula (2) to further enhance the effect achievable by satisfying conditional formula (2):

$$75.0 < v1p \quad (2')$$

If the value is lower than the lower limit of conditional formula (3), it becomes difficult to suppress fluctuations of a lateral chromatic aberration and a longitudinal chromatic aberration during magnification change. If the value exceeds the upper limit of conditional formula (3), secondary chromatic aberrations are generated, and it becomes difficult to cope with visible light and near-infrared light at the same time. When conditional formula (3) is satisfied, it is possible to suppress a fluctuation of chromatic aberrations during magnification change, and to cope with a wide wavelength band from a visible range through a near-infrared range.

It is desirable that conditional formula (3') is satisfied instead of conditional formula (3) to further enhance the effect achievable by satisfying conditional formula (3):

$$35.0 < v2n < 39.0 \quad (3').$$

Further, it is desirable that a variable magnification optical system according to an embodiment of the present invention satisfies the following conditional formula (4):

$$0.50 < (R21f + R21r)/(R21f - R21r) < 1.30 \quad (4), \text{where}$$

R21 f: a curvature radius of an object-side surface of 21st lens L21, and

R21 r: a curvature radius of an image-side surface of 21st lens L21.

If the value is lower than the lower limit of conditional formula (4), distortion and a lateral chromatic aberration in a peripheral image formation area deteriorate at a wide-angle end. If the value exceeds the upper limit of conditional formula (4), it becomes difficult to correct a spherical aberration for a short wavelength at a telephoto end. When conditional formula (4) is satisfied, it is possible to excellently correct aberrations at a wide-angle end and at a telephoto end.

It is more desirable that conditional formula (4') is satisfied instead of conditional formula (4) to further enhance the effect achievable by satisfying conditional formula (4), and it is even more desirable that conditional formula (4") is satisfied:

$$0.70 < (R21f + R21r)/(R21f - R21r) < 1.20 \quad (4');$$

and $$0.75 < (R21f + R21r)/(R21f - R21r) < 1.10 \quad (4'')$$

When the variable magnification optical system according to an embodiment of the present invention is used in tough conditions, for example, such as outdoors, it is desirable that the material of a lens arranged on the most object-side is resistant to a deterioration of a surface by wind and rain and a change in temperature by direct sunlight. Further, it is desirable that the material is resistant to chemicals, such as oil and fat and detergent. In other words, it is desirable to use a material with excellent water resistance, temperature resistance, acid resistance, chemical resistance and the like. It is desirable that the material is hard and not easily breakable. When it is important to satisfy these requirements, it is desirable that the material of the lens arranged on the most object-side is glass. Alternatively, a transparent ceramic may be used.

When the variable magnification optical system according to an embodiment of the present invention is used in tough conditions, it is desirable that a multi-layer coating for protection is applied. Besides the coating for protection, an anti-reflection coating for reducing ghost light or the like during usage may be applied.

In the example illustrated in FIG. 1, optical member PP is arranged further on the image side of the most image-side lens. Instead, various filters may be arranged between lenses. Alternatively, a coating having similar action to that of various filters may be applied to a lens surface of one of lenses.

Next, numerical value examples of the variable magnification optical system of the present invention will be described.

FIG. 1 through FIG. 5 illustrate lens cross sections of the variable magnification optical systems in Examples 1 through 5, respectively.

Various data about the variable magnification optical systems in Examples 1 through 5 are shown in Table 1 through Table 15, which will be presented later. In the following descriptions, Example 1 will be mainly used as an example. Since a description method, the meanings of signs, and the like are basically similar in the other examples, repeating explanation will be omitted.

Table 1 shows basic lens data on a variable magnification optical system in Example 1 when the variable magnification optical system is focused on an object at infinity. In Table 1, the column of Si shows the surface numbers of i-th (i=1, 2, 3, surfaces. The surface number of the object-side surface of the most object-side element is the first surface, and the surface numbers sequentially increase toward the image side. The column of Ri shows the curvature radius of the i-th surface. The column of Di shows a surface distance, on optical axis Z, between the i-th surface and the (i+1)th surface. Here, a numerical value at the bottom of the column of Di shows a surface distance between the last surface in the table and image plane Sim. The sign of a curvature radius is positive when the shape of a surface is convex toward an object side, and negative when the shape of a surface is convex toward an image side.

In the basic lens data, the column of Ndj shows the refractive index of a j-th (j=1, 2, 3, . . . ) composition element for d-line (wavelength is 587.6 nm) when the most object-side composition element is the first element, and the value of j sequentially increases toward the image side. The column of vdj shows the Abbe number of the j-th composition element for d-line.

The table of basic lens data includes aperture stop St and optical member PP. The term "(St)" is also written for a surface corresponding to aperture stop St in the column of surface numbers. Further, in Table 1, the mark "*" is attached to the surface number of an aspherical surface. Table 1 shows the numerical value of a paraxial curvature radius, as a curvature radius of an aspherical surface.

In the table of basic lens data, "VARIABLE 1", "VARIABLE 2", "VARIABLE 3" and "VARIABLE 4" are written in the rows of surface distances that change when magnification is changed. VARIABLE 1 is a distance between first lens group G1 and second lens group G2. VARIABLE 2 is a distance between second lens group G2 and aperture stop St. VARIABLE 3 is a distance between third lens group G3 and fourth lens group G4. VARIABLE 4 is a distance between fourth lens group G4 and optical member PP.

Table 2 shows specification and variable distances of the variable magnification optical system in Example 1 at a wide-angle end, in a middle focal length state, and at a telephoto end. The table of specification shows variable magnification ratio, focal length f of an entire system, back focus Bf (distance in air), F-number Fno., and full angle of view 2ω. The table of specification shows values for d-line. The table of variable distance shows values of surface distances for VARIABLE 1, VARIABLE 2, VARIABLE 3 AND VARIABLE 4, respectively.

Table 3 shows surface numbers of aspherical surfaces of the variable magnification optical system in Example 1, and aspheric coefficients for the aspherical surfaces. In the numerical values of the aspheric coefficients of Table 3, "E-n" (n: integer) means "×10⁻ⁿ". The aspheric coefficients are values of coefficients K, Am (m=3, 4, 5 . . . 20) in the following aspherical equation:

$$Zd = \frac{C \times Y^2}{1 + \sqrt{1 - K \times C^2 \times Y^2}} + \sum_m A_m Y^m, \quad \text{[Equation 1]}$$

where

Zd: depth of aspherical surface (the length of a perpendicular from a point on the aspherical surface at height Y to a flat plane that contacts with the vertex of the aspherical surface and is perpendicular to the optical axis), Y: height (the length from the optical axis to the lens surface), C: paraxial curvature, and K, Am: aspheric coefficients (m=3, 4, 5 . . . 20).

In the following tables, degree is used as the unit of angle, and mm is used as the unit of length. However, since an optical system can be used by proportionally enlarging or reducing the optical system, other appropriate units may be used. Further, the numerical values in each table described in the specification of the present invention have been rounded to predetermined digits.

TABLE 1

EXAMPLE 1
BASIC LENS DATA

| Si | Ri | Di | Ndj | vdj |
|---|---|---|---|---|
| 1 | 90.7531 | 4.23 | 1.49700 | 81.54 |
| 2 | −90.7531 | 0.10 | | |
| 3 | 27.0812 | 6.29 | 1.49700 | 81.54 |
| 4 | −250.0000 | 4.06 | 1.80518 | 25.42 |
| 5 | 106.6329 | VARIABLE 1 | | |
| 6 | ∞ | 0.80 | 1.80100 | 34.97 |
| 7 | 15.8269 | 0.57 | | |
| 8 | 37.6275 | 2.83 | 1.92286 | 18.90 |
| 9 | −14.3113 | 0.71 | 1.59551 | 39.24 |
| 10 | 15.3959 | 1.62 | | |
| 11 | −10.5906 | 0.86 | 1.80610 | 33.27 |
| 12 | −47.3592 | VARIABLE 2 | | |
| 13(St) | ∞ | 1.29 | | |
| 14 | 14.0000 | 5.84 | 1.49700 | 81.54 |
| 15 | −9.3025 | 0.80 | 1.80100 | 34.97 |
| 16 | −22.7767 | VARIABLE 3 | | |
| *17 | 9.9792 | 4.95 | 1.56867 | 58.27 |
| *18 | −13.6820 | 1.11 | | |
| 19 | −14.3852 | 2.49 | 1.59551 | 39.24 |
| 20 | 7.8970 | 1.44 | | |
| 21 | 12.6687 | 3.87 | 1.80400 | 46.58 |
| 22 | ∞ | VARIABLE 4 | | |
| 23 | ∞ | 1.50 | 1.51633 | 64.14 |
| 24 | ∞ | 0.12 | | |

TABLE 2

EXAMPLE 1
SPECIFICATION (d-LINE)

| | WIDE | MIDDLE | TELE |
|---|---|---|---|
| VARIABLE MAGNIFICATION RATIO | 1.00 | 2.12 | 3.23 |
| f | 15.03 | 31.79 | 48.55 |
| Bf | 7.71 | 9.09 | 7.81 |
| Fno. | 1.55 | 1.81 | 2.11 |
| 2 ω [°] | 24.8 | 12.2 | 8.0 |

VARIABLE DISTANCE

| | WIDE | MIDDLE | TELE |
|---|---|---|---|
| VARIABLE 1 | 7.79 | 15.23 | 19.26 |
| VARIABLE 2 | 12.28 | 4.84 | 0.81 |

TABLE 2-continued

| | | | |
|---|---|---|---|
| VARIABLE 3 | 3.38 | 2.00 | 3.28 |
| VARIABLE 4 | 6.60 | 7.98 | 6.70 |

TABLE 3

EXAMPLE 1
ASPHERIC COEFFICIENT

| SURFACE NUMBER | 17 | 18 |
|---|---|---|
| K | 7.48146E−01 | 2.90934E+00 |
| A3 | 5.71011E−05 | −2.97126E−05 |
| A4 | −2.31568E−06 | 4.44917E−04 |
| A5 | −1.80372E−04 | −1.15400E−04 |
| A6 | 2.07119E−04 | 3.69275E−05 |
| A7 | −1.14436E−04 | −8.40462E−06 |
| A8 | 3.21692E−05 | 4.48843E−06 |
| A9 | −3.41645E−06 | −1.45663E−06 |
| A10 | −2.84012E−07 | 1.64943E−07 |
| A11 | 7.76152E−08 | −4.28226E−08 |
| A12 | −1.06476E−08 | 1.47621E−08 |
| A13 | 5.92619E−09 | 1.31708E−09 |
| A14 | −1.41322E−09 | −6.68616E−10 |
| A15 | 1.75353E−10 | −7.42931E−11 |
| A16 | −3.14001E−11 | 1.34379E−11 |
| A17 | 4.73706E−12 | 3.12924E−12 |
| A18 | −5.36021E−15 | 1.62497E−13 |
| A19 | −6.40320E−14 | −1.70227E−13 |
| A20 | 4.15402E−15 | 1.32511E−14 |

TABLE 4

EXAMPLE 2
BASIC LENS DATA

| Si | Ri | Di | Ndj | νdj |
|---|---|---|---|---|
| 1 | 45.1691 | 5.49 | 1.49700 | 81.54 |
| 2 | −123.7704 | 0.10 | | |
| 3 | 31.1109 | 5.42 | 1.49700 | 81.54 |
| 4 | −131.3519 | 1.28 | 1.80518 | 25.42 |
| 5 | 144.5124 | VARIABLE 1 | | |
| 6 | −153.9919 | 0.80 | 1.80100 | 34.97 |
| 7 | 17.6670 | 0.38 | | |
| 8 | 31.4790 | 2.95 | 1.92286 | 18.90 |
| 9 | −14.7513 | 0.71 | 1.66680 | 33.05 |
| 10 | 15.8776 | 1.28 | | |
| 11 | −12.2716 | 0.70 | 1.80400 | 46.58 |
| 12 | −243.4626 | VARIABLE 2 | | |
| 13(St) | ∞ | 2.03 | | |
| 14 | 17.8644 | 3.05 | 1.49700 | 81.54 |
| 15 | −59.2097 | 0.35 | | |
| 16 | 15.4525 | 4.49 | 1.49700 | 81.54 |
| 17 | −14.0543 | 0.70 | 1.80100 | 34.97 |
| 18 | 106.4230 | VARIABLE 3 | | |
| *19 | 9.1654 | 5.00 | 1.56867 | 58.27 |
| *20 | −15.6984 | 1.45 | | |
| 21 | −13.5158 | 0.70 | 1.59551 | 39.24 |
| 22 | 7.6932 | 0.48 | | |
| 23 | 11.1881 | 2.56 | 1.80610 | 40.92 |
| 24 | 147.0455 | VARIABLE 4 | | |
| 25 | ∞ | 1.50 | 1.51633 | 64.14 |
| 26 | ∞ | 0.16 | | |

TABLE 5

EXAMPLE 2
SPECIFICATION (d-LINE)

| | WIDE | MIDDLE | TELE |
|---|---|---|---|
| VARIABLE MAGNIFICATION RATIO | 1.00 | 2.11 | 3.22 |
| f | 15.09 | 31.80 | 48.51 |
| Bf | 7.75 | 9.19 | 7.78 |
| Fno. | 1.55 | 1.74 | 2.04 |
| 2 ω [°] | 24.6 | 12.0 | 7.8 |

VARIABLE DISTANCE

| | WIDE | MIDDLE | TELE |
|---|---|---|---|
| VARIABLE 1 | 8.24 | 15.23 | 18.91 |
| VARIABLE 2 | 11.62 | 4.63 | 0.95 |
| VARIABLE 3 | 6.47 | 5.02 | 6.44 |
| VARIABLE 4 | 6.60 | 8.05 | 6.63 |

TABLE 6

EXAMPLE 2
ASPHERIC COEFFICIENT

| SURFACE NUMBER | 19 | 20 |
|---|---|---|
| K | −1.91548E−01 | 4.55221E+00 |
| A3 | −5.42034E−04 | −1.04351E−03 |
| A4 | 7.24078E−04 | 1.49772E−03 |
| A5 | −4.66621E−04 | −6.26584E−04 |
| A6 | 2.11112E−04 | −6.84020E−05 |
| A7 | −5.75186E−05 | 2.59240E−04 |
| A8 | 8.73797E−06 | −1.34665E−04 |
| A9 | −4.20279E−07 | 2.77117E−05 |
| A10 | −1.73166E−07 | 1.60399E−07 |
| A11 | 7.12832E−08 | −7.96512E−07 |
| A12 | −1.35423E−08 | 6.42781E−09 |
| A13 | 1.93965E−09 | −8.75150E−09 |
| A14 | −4.89184E−10 | 1.76418E−08 |
| A15 | 5.88004E−11 | −2.17395E−09 |
| A16 | 9.39526E−12 | −6.98300E−10 |
| A17 | −1.21768E−12 | 9.51015E−11 |
| A18 | −4.47559E−13 | 3.20588E−11 |
| A19 | 8.76249E−14 | −7.72372E−12 |
| A20 | −4.30667E−15 | 4.68919E−13 |

TABLE 7

EXAMPLE 3
BASIC LENS DATA

| Si | Ri | Di | Ndj | νdj |
|---|---|---|---|---|
| 1 | 49.9846 | 5.25 | 1.49700 | 81.54 |
| 2 | −116.6595 | 0.12 | | |
| 3 | 31.6724 | 4.92 | 1.49700 | 81.54 |
| 4 | −250.0000 | 1.20 | 1.80518 | 25.42 |
| 5 | 100.7189 | VARIABLE 1 | | |
| 6 | −318.1443 | 0.80 | 1.80100 | 34.97 |
| 7 | 20.7602 | 0.92 | | |
| 8 | 20.8765 | 2.71 | 1.92286 | 18.90 |
| 9 | −20.8765 | 0.71 | 1.66680 | 33.05 |
| 10 | 12.3192 | 1.38 | | |
| 11 | −13.2882 | 0.77 | 1.83481 | 42.73 |
| 12 | −1748.0569 | VARIABLE 2 | | |
| 13(St) | ∞ | 1.72 | | |
| 14 | 13.6175 | 5.68 | 1.49700 | 81.54 |
| 15 | −9.8279 | 0.70 | 1.80610 | 33.27 |
| 16 | −24.8907 | VARIABLE 3 | | |
| *17 | 10.0624 | 5.00 | 1.56867 | 58.27 |
| *18 | −13.5960 | 0.95 | | |
| 19 | −14.6504 | 3.82 | 1.58144 | 40.75 |
| 20 | 7.8863 | 0.78 | | |
| 21 | 12.4257 | 2.64 | 1.80400 | 46.58 |
| 22 | 112.7571 | VARIABLE 4 | | |
| 23 | ∞ | 1.50 | 1.51633 | 64.14 |
| 24 | ∞ | 0.17 | | |

TABLE 8

EXAMPLE 3
SPECIFICATION (d-LINE)

|  | WIDE | MIDDLE | TELE |
|---|---|---|---|
| VARIABLE MAGNIFICATION RATIO | 1.00 | 2.11 | 122 |
| f' | 15.09 | 31.81 | 48.53 |
| Bf' | 7.76 | 9.24 | 8.10 |
| Fno. | 1.55 | 1.83 | 2.16 |
| 2ω [°] | 24.8 | 12.2 | 7.6 |

VARIABLE DISTANCE

|  | WIDE | MIDDLE | TELE |
|---|---|---|---|
| VARIABLE 1 | 9.29 | 16.86 | 21.05 |
| VARIABLE 2 | 12.75 | 5.18 | 0.99 |
| VARIABLE 3 | 4.14 | 2.66 | 3.79 |
| VARIABLE 4 | 6.60 | 8.08 | 6.95 |

TABLE 9

EXAMPLE 3
ASPHERIC COEFFICIENT

| SURFACE NUMBER | 17 | 18 |
|---|---|---|
| K | 8.81412E−01 | 2.91546E+00 |
| A3 | −1.69335E−04 | −3.55196E−04 |
| A4 | 2.28852E−04 | 9.97619E−04 |
| A5 | −1.99669E−04 | −5.43012E−04 |
| A6 | 5.86965E−05 | 2.04484E−04 |
| A7 | 3.12400E−06 | −2.72935E−05 |
| A8 | −5.00577E−06 | −1.39863E−06 |
| A9 | 2.85041E−07 | −1.90929E−07 |
| A10 | 2.49815E−07 | 1.66509E−07 |
| A11 | −2.40617E−08 | 1.15171E−08 |
| A12 | −6.65677E−09 | 1.27260E−08 |
| A13 | 5.22915E−10 | −6.26375E−09 |
| A14 | 8.22301E−11 | −5.77970E−11 |
| A15 | 7.06724E−12 | 1.92343E−10 |
| A16 | 1.03129E−12 | −3.61404E−12 |
| A17 | −8.57764E−13 | 1.57868E−12 |
| A18 | −6.52771E−15 | −1.70862E−12 |
| A19 | 1.92255E−14 | 2.66020E−13 |
| A20 | −1.29507E−15 | −1.23786E−14 |

TABLE 10

EXAMPLE 4
BASIC LENS DATA

| Si | Ri | Di | Ndj | νdj |
|---|---|---|---|---|
| 1 | 45.0514 | 5.32 | 1.49700 | 81.54 |
| 2 | −141.1626 | 0.10 | | |
| 3 | 31.7435 | 6.59 | 1.49700 | 81.54 |
| 4 | −248.5359 | 1.20 | 1.80518 | 25.42 |
| 5 | 96.5535 | VARIABLE 1 | | |
| 6 | −390.3541 | 0.80 | 1.80100 | 34.97 |
| 7 | 15.3129 | 1.64 | | |
| 8 | 17.5780 | 3.06 | 1.92286 | 20.88 |
| 9 | −16.7595 | 0.71 | 1.67270 | 32.10 |
| 10 | 14.4592 | 1.09 | | |
| 11 | −14.0409 | 0.70 | 1.83481 | 42.73 |
| 12 | 113.5397 | VARIABLE 2 | | |
| 13(St) | ∞ | 1.50 | | |
| 14 | 13.3608 | 2.40 | 1.51633 | 64.14 |
| 15 | −719.6306 | 0.23 | | |
| 16 | 146.6843 | 3.70 | 1.49700 | 81.54 |
| 17 | −9.9629 | 0.70 | 1.81907 | 30.44 |
| 18 | −29.5764 | VARIABLE 3 | | |
| *19 | 9.8349 | 4.75 | 1.56867 | 58.27 |
| *20 | −14.3927 | 1.28 | | |
| 21 | −13.3109 | 2.41 | 1.57125 | 41.64 |
| 22 | 8.2631 | 0.44 | | |
| 23 | 14.7561 | 3.92 | 1.81310 | 43.86 |
| 24 | −378.3289 | VARIABLE 4 | | |
| 25 | ∞ | 1.50 | 1.51633 | 64.14 |
| 26 | ∞ | 0.08 | | |

TABLE 11

EXAMPLE 4
SPECIFICATION (d-LINE)

|  | WIDE | MIDDLE | TELE |
|---|---|---|---|
| VARIABLE MAGNIFICATION RATIO | 1.00 | 2.10 | 3.21 |
| f' | 15.09 | 31.76 | 48.43 |
| Bf' | 7.67 | 9.09 | 7.84 |
| Fno. | 1.56 | 1.82 | 2.13 |
| 2ω [°] | 24.8 | 12.2 | 8.0 |

VARIABLE DISTANCE

|  | WIDE | MIDDLE | TELE |
|---|---|---|---|
| VARIABLE 1 | 7.22 | 14.74 | 18.91 |
| VARIABLE 2 | 12.84 | 5.32 | 1.15 |
| VARIABLE 3 | 3.81 | 2.39 | 3.64 |
| VARIABLE 4 | 6.60 | 8.02 | 6.77 |

TABLE 12

EXAMPLE 4
ASPHERIC COEFFICIENT

| SURFACE NUMBER | 19 | 20 |
|---|---|---|
| K | 1.36436E+00 | 3.23307E+00 |
| A3 | −3.94933E−04 | −7.06165E−04 |
| A4 | 7.01392E−04 | 1.50494E−03 |
| A5 | −9.16196E−04 | −8.18298E−04 |
| A6 | 6.14179E−04 | −4.84847E−05 |
| A7 | −2.60024E−04 | 4.04198E−04 |
| A8 | 7.09212E−05 | −2.36542E−04 |
| A9 | −1.22118E−05 | 4.93036E−05 |
| A10 | 1.29502E−06 | 3.88713E−06 |
| A11 | −1.49569E−07 | −3.65271E−06 |
| A12 | 4.02518E−08 | 6.21355E−07 |
| A13 | −6.64949E−09 | −5.56475E−08 |
| A14 | 2.43278E−10 | 1.01268E−08 |
| A15 | −5.34042E−11 | −1.44752E−09 |
| A16 | 4.29862E−11 | 1.42393E−10 |
| A17 | −8.24092E−12 | −1.12926E−10 |
| A18 | 6.18842E−13 | 3.47902E−11 |
| A19 | −1.39306E−14 | −4.13160E−12 |
| A20 | −1.91634E−16 | 1.75061E−13 |

TABLE 13

EXAMPLE 5
BASIC LENS DATA

| Si | Ri | Di | Ndj | νdj |
|---|---|---|---|---|
| 1 | 87.6419 | 4.44 | 1.49700 | 81.54 |
| 2 | −87.6419 | 0.11 | | |
| 3 | 27.0983 | 5.65 | 1.49700 | 81.54 |
| 4 | −239.4277 | 2.59 | 1.80518 | 25.42 |
| 5 | 110.6769 | VARIABLE 1 | | |
| 6 | −357.0443 | 0.80 | 1.80100 | 34.97 |

TABLE 13-continued

EXAMPLE 5
BASIC LENS DATA

| Si | Ri | Di | Ndj | νdj |
|---|---|---|---|---|
| 7 | 16.3634 | 0.51 | | |
| 8 | 36.6575 | 2.83 | 1.92286 | 18.90 |
| 9 | −15.1061 | 1.07 | 1.59551 | 39.24 |
| 10 | 16.0265 | 1.34 | | |
| 11 | −11.3909 | 0.84 | 1.80610 | 33.27 |
| 12 | −65.0735 | VARIABLE 2 | | |
| 13(St) | ∞ | 1.51 | | |
| 14 | 13.2662 | 5.83 | 1.49700 | 81.54 |
| 15 | −9.5747 | 0.70 | 1.80100 | 34.97 |
| 16 | −25.2858 | VARIABLE 3 | | |
| *17 | 9.9074 | 5.00 | 1.56867 | 58.27 |
| *18 | −13.0538 | 0.88 | | |
| 19 | −14.4768 | 2.84 | 1.58144 | 40.75 |
| 20 | 7.5428 | 1.44 | | |
| 21 | 11.5840 | 2.77 | 1.80400 | 46.58 |
| 22 | 100.0007 | VARIABLE 4 | | |
| 23 | ∞ | 1.50 | 1.51633 | 64.14 |
| 24 | ∞ | 0.48 | | |

TABLE 14

EXAMPLE 5
SPECIFICATION (d-LINE)

| | WIDE | MIDDLE | TELE |
|---|---|---|---|
| VARIABLE MAGNIFICATION RATIO | 1.00 | 2.11 | 3.22 |
| f | 15.08 | 31.79 | 48.50 |
| Bf | 8.07 | 9.26 | 7.73 |
| Fno. | 1.55 | 1.80 | 2.09 |
| 2ω [°] | 24.6 | 12.2 | 7.8 |

VARIABLE DISTANCE

| | WIDE | MIDDLE | TELE |
|---|---|---|---|
| VARIABLE 1 | 8.89 | 16.35 | 20.43 |
| VARIABLE 2 | 12.40 | 4.94 | 0.86 |

TABLE 14-continued

| | | | |
|---|---|---|---|
| VARIABLE 3 | 3.52 | 2.32 | 3.86 |
| VARIABLE 4 | 6.60 | 7.80 | 6.26 |

TABLE 15

EXAMPLE 5
ASPHERIC COEFFICIENT

| SURFACE NUMBER | 17 | 18 |
|---|---|---|
| K | 7.74906E−01 | 2.77479E+00 |
| A3 | 1.14126E−04 | 3.43965E−04 |
| A4 | 1.70153E−04 | 2.37665E−04 |
| A5 | −4.33139E−04 | −5.63385E−05 |

TABLE 15-continued

EXAMPLE 5
ASPHERIC COEFFICIENT

| SURFACE NUMBER | 17 | 18 |
|---|---|---|
| A6 | 3.33793E−04 | 3.60211E−05 |
| A7 | −1.23579E−04 | 1.01526E−06 |
| A8 | 1.53343E−05 | −3.16343E−06 |
| A9 | 3.18754E−06 | −4.78042E−07 |
| A10 | −6.98791E−07 | 4.16446E−07 |
| A11 | −2.05137E−07 | 3.91219E−09 |
| A12 | 5.53383E−08 | −2.29180E−08 |
| A13 | 3.56395E−09 | 6.68807E−10 |
| A14 | −1.64549E−09 | 7.88270E−10 |
| A15 | −1.94472E−11 | −4.96255E−11 |
| A16 | 2.01584E−11 | −1.68023E−11 |
| A17 | 1.02892E−12 | 2.23926E−12 |
| A18 | −3.17252E−14 | 4.48561E−14 |
| A19 | −5.85849E−14 | −2.66102E−14 |
| A20 | 4.54890E−15 | 1.63883E−15 |

In all of Examples 1 through 5, the optical system consists of first lens group G1 having positive refractive power, second lens group G2 having negative refractive power, third lens group G3 having positive refractive power and fourth lens group G4 having positive refractive power in this order from an object side. Further, when magnification is changed from a wide-angle end to a telephoto end, first lens group G1 and third lens group G3 are fixed with respect to image plane Sim in the direction of an optical axis, and magnification is changed from the wide-angle end to the telephoto end by moving second lens group G2 along optical axis Z toward an image side, and correction of an image plane and focusing, which have been necessitated by magnification change, are performed by moving fourth lens group G4 along optical axis.

Table 16 shows values corresponding to conditional formulas (1) through (4) for variable magnification optical systems in Example 1 through 5. Table 16 shows values for d-line.

TABLE 16

| | CONDITIONAL FORMULA | EXAMPLE 1 | EXAMPLE 2 | EXAMPLE 3 | EXAMPLE 4 | EXAMPLE 5 |
|---|---|---|---|---|---|---|
| (1) | Rc/fw | −0.952 | −0.978 | −1.383 | −1.111 | −1.002 |
| (2) | ν1p | 81.54 | 81.54 | 81.54 | 81.54 | 81.54 |
| (3) | ν2n | 35.83 | 38.20 | 36.92 | 36.60 | 35.83 |
| (4) | (R21f + R21r)/(R21f − R21r) | 1.000 | 0.794 | 0.877 | 0.925 | 0.912 |

Figure 6:
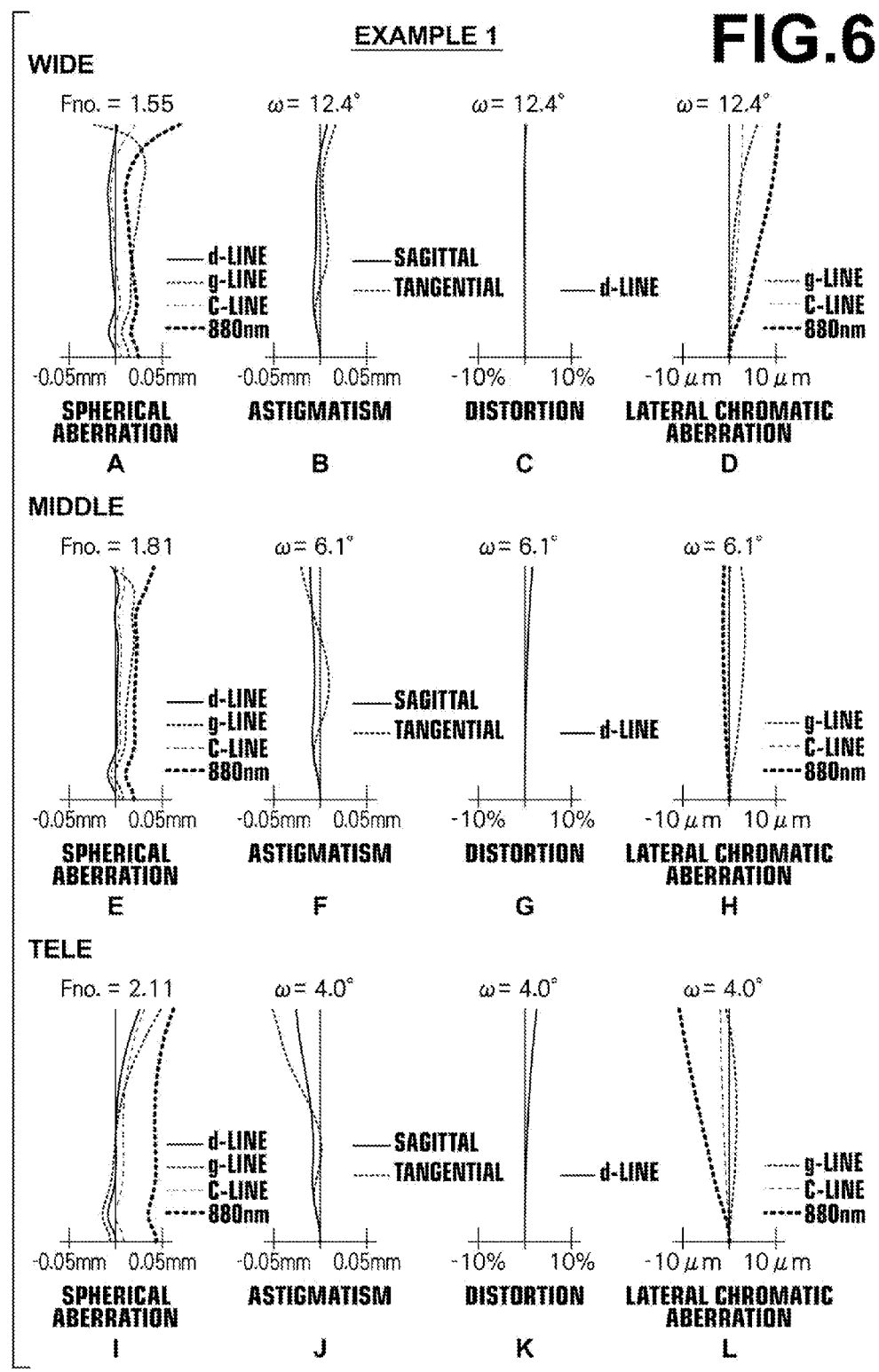
FIG. 6, Sections A through L are aberration diagrams of the variable magnification optical system in Example 1 of the present invention.

FIG. 6, Sections A through D illustrate a spherical aberration, astigmatism, distortion (a distortion aberration), and a lateral chromatic aberration (a chromatic aberration of magnification) of the variable magnification optical system in Example 1, respectively, at a wide-angle end. FIG. 6, Sections E through H illustrate a spherical aberration, astigmatism, distortion (a distortion aberration), and a lateral chromatic aberration (a chromatic aberration of magnification) of the variable magnification optical system in Example 1, respectively, at a middle focal position. FIG. 6, Sections I through L illustrate a spherical aberration, astigmatism, distortion (a distortion aberration), and a lateral chromatic aberration (a chromatic aberration of magnification) of the variable magnification optical system in Example 1, respectively, at a telephoto end. In each aberration diagram, d-line is used as reference. In the diagram of a spherical aberration, aberrations for g-line (wavelength is 435.8 nm), C-line (wavelength is 656.3 nm) and the wavelength of 880 nm are also illustrated. In the diagram of astigmatism, an aberration for a sagittal direction is indicated by a solid line, and an aberration for a tangential direction is indicated by a broken line. In the diagram of a spherical aberration, Fno. represents an F-number, and in the other aberration diagrams, ω represents a half angle of view.

Figure 7:
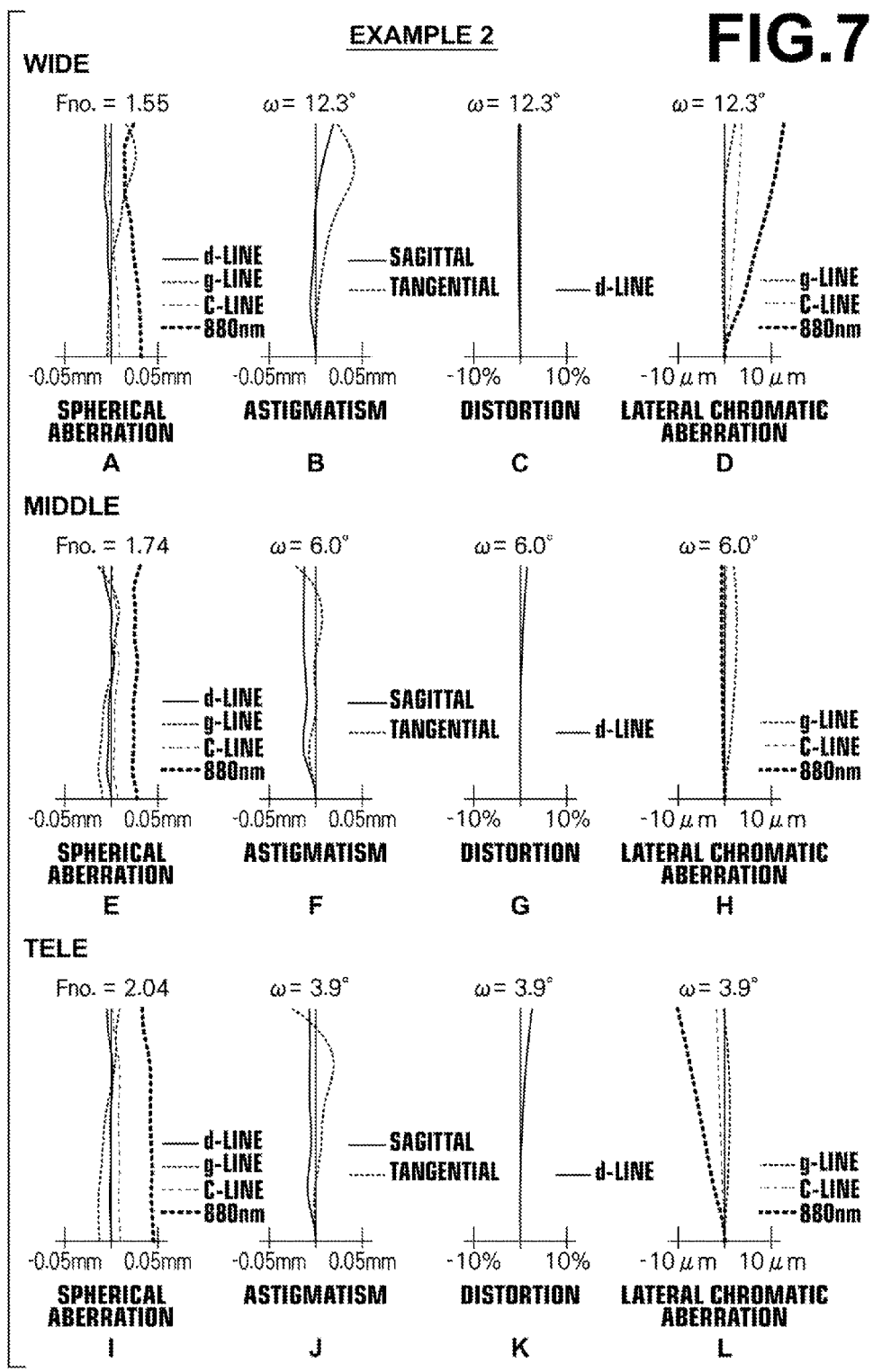
FIG. 7, Sections A through L are aberration diagrams of the variable magnification optical system in Example 2 of the present invention.
Figure 8:
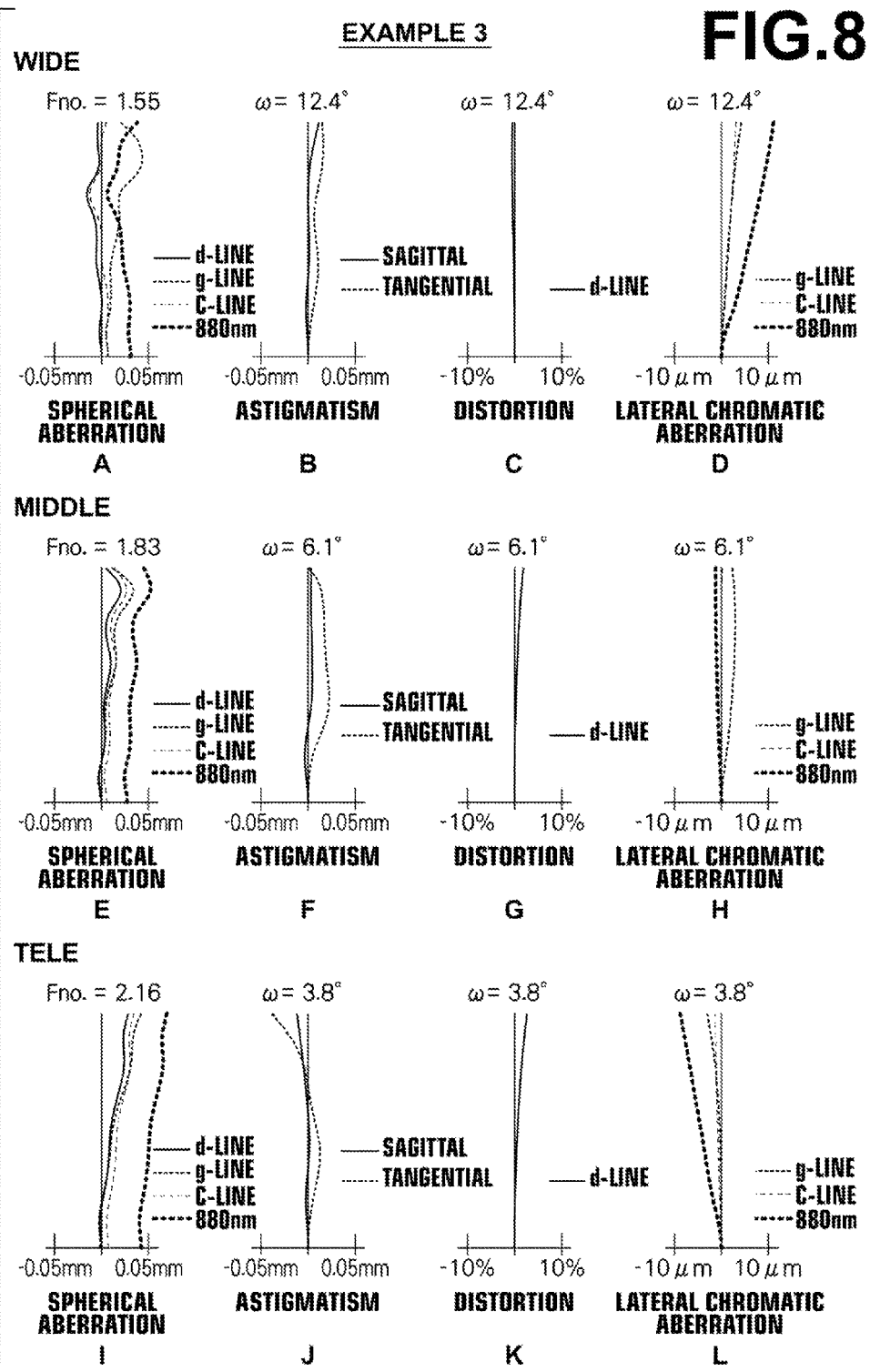
FIG. 8, Sections A through L are aberration diagrams of the variable magnification optical system in Example 3 of the present invention.
Figure 9:
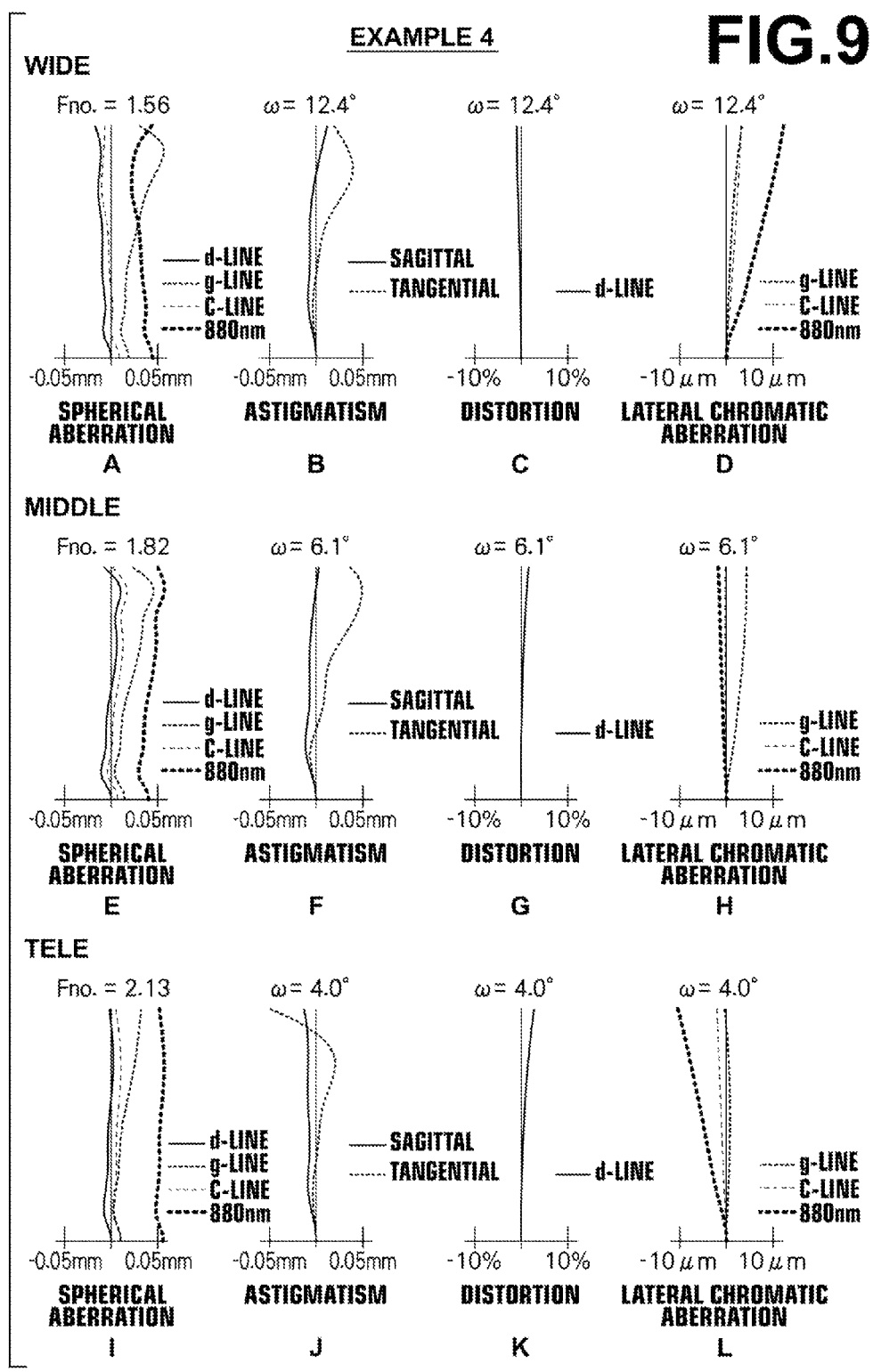
FIG. 9, Sections A through L are aberration diagrams of the variable magnification optical system in Example 4 of the present invention.
Figure 10:
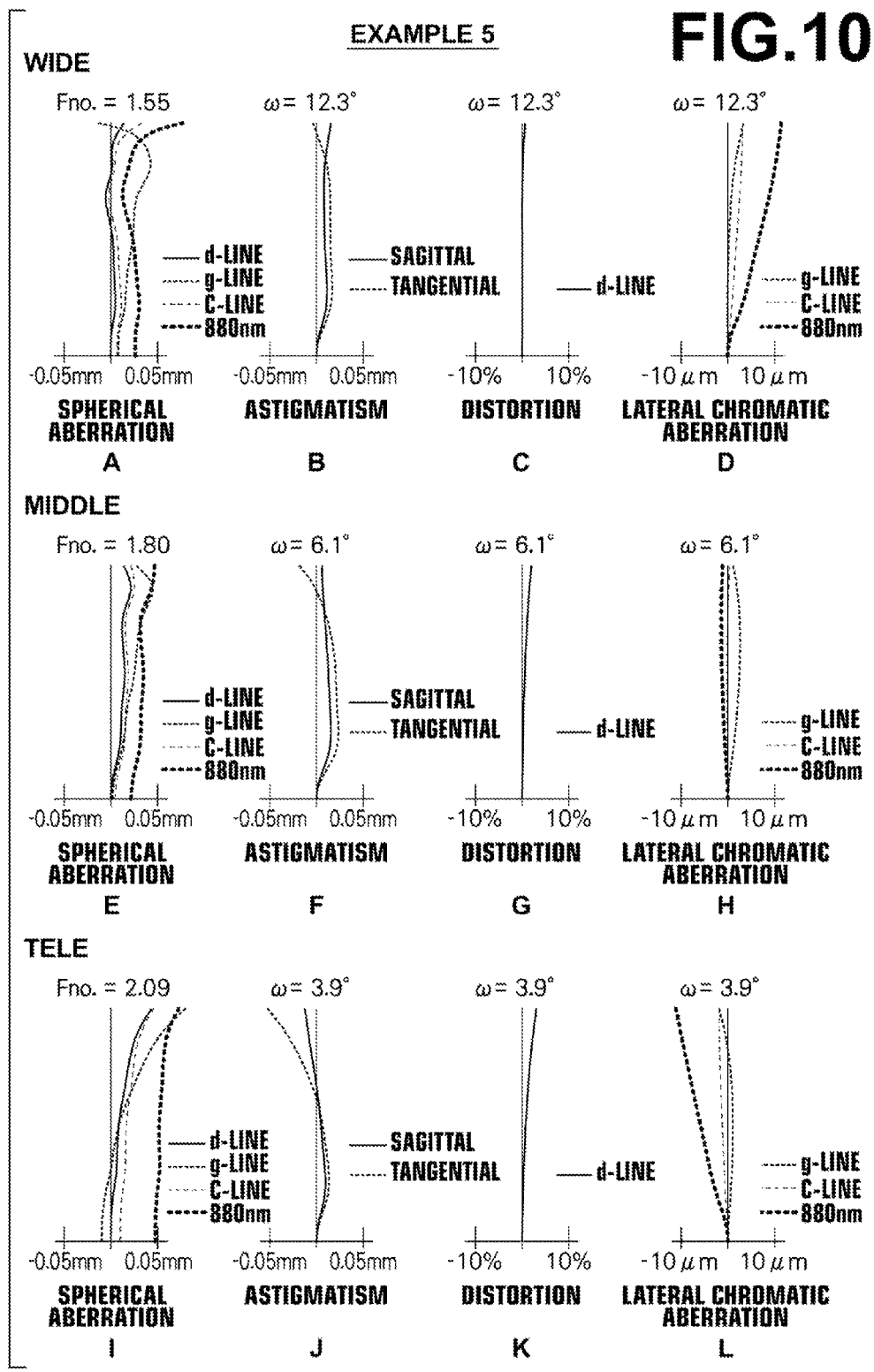
FIG. 10, Sections A through L are aberration diagrams of the variable magnification optical system in Example 5 of the present invention.

Similarly, FIG. 7, Sections A through L, FIG. 8, Sections A through L, FIG. 9, Sections A through L, and FIG. 10, Sections A through L illustrate aberration diagrams of the variable magnification optical systems in Examples 2 through 5, respectively, at a wide-angle end, at a middle focal position, and at a telephoto end. All of the aberration diagrams illustrate aberrations when the optical system is focused on an object at infinity.

Figure 11:
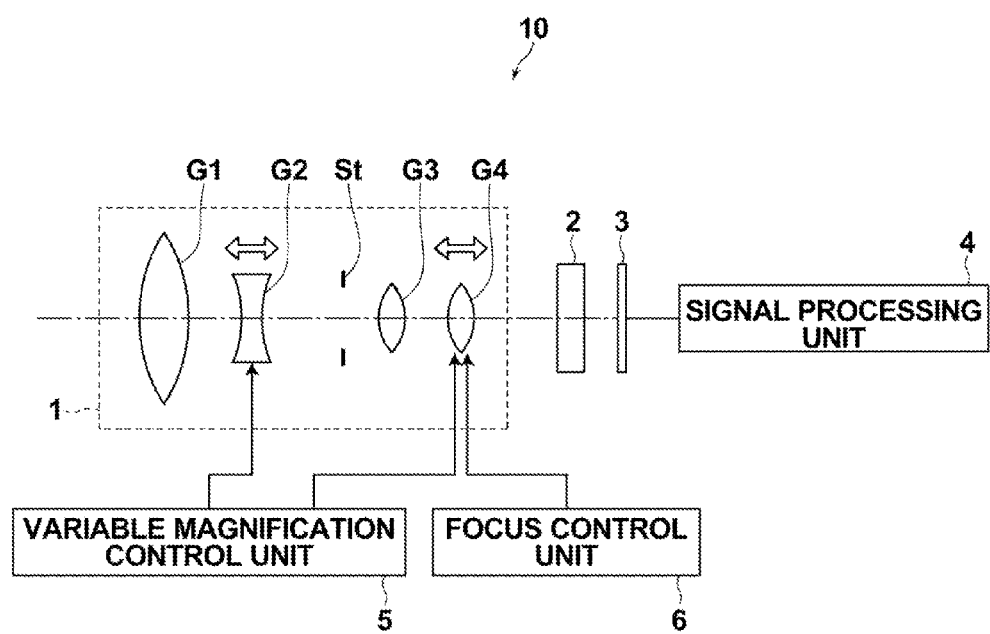
FIG. 11 is a schematic diagram illustrating the configuration of an imaging apparatus according to an embodiment of the present invention.

FIG. 11 is a schematic diagram illustrating the configuration of an imaging apparatus using a variable magnification optical system according to an embodiment of the present invention, as an example of an imaging apparatus according to an embodiment of the present invention. The imaging apparatus is, for example, a surveillance camera, a video camera, an electronic still camera, or the like.

The imaging apparatus 10 illustrated in FIG. 11 includes the variable magnification optical system 1, a filter 2 arranged on the image side of the variable magnification optical system 1, an imaging device 3 that images an image of a subject formed by the variable magnification optical system, and a signal processing unit 4 that performs operation processing on a signal output from the imaging device 3. The variable magnification optical system 1 includes positive first lens group G1, negative second lens group G2, aperture stop St, positive third lens group G3 and positive fourth lens group G4. In FIG. 11, each lens group is schematically illustrated. The imaging device 3 images an image of a subject formed by the variable magnification optical system 1, and converts the image into electrical signals. The imaging device 3 is arranged in such a manner that the imaging surface of the imaging device 3 is located at the same position as an image plane of the variable magnification optical system. For example, a CCD, a CMOS or the like may be used as the imaging device 3.

Further, the imaging apparatus 10 includes a variable magnification control unit 5 for changing magnification of the variable magnification optical system 1, and a focus control unit 6 for adjusting focus of the variable magnification optical system 1. Further, the imaging apparatus 10 may include a stop control unit for changing the aperture diameter of aperture stop St, which is not illustrated in FIG. 11.

So far, the present invention has been described by using embodiments and examples. However, the present invention is not limited to the embodiments nor the examples, and various modifications are possible. For example, values, such as the curvature radius of each lens, distances between surfaces, refractive indices, Abbe numbers and aspheric coefficients, are not limited to the values in the numerical value examples, but may be other values.

What is claimed is:

1. A variable magnification optical system substantially consisting of four lens groups of a first lens group having positive refractive power, a second lens group having negative refractive power, a third lens group having positive refractive power and a fourth lens group having positive refractive power in this order from an object side, wherein the first lens group and the third lens group are fixed with respect to the direction of an optical axis when magnification is changed from a wide-angle end to a telephoto end, and the magnification is changed from the wide-angle end to the telephoto end by moving the second lens group along the optical axis toward an image side, and correction of an image plane and focusing, which have been necessitated by magnification change, are performed by moving the fourth lens group along the optical axis, and wherein the first lens group substantially consists of three lenses of a lens having positive refractive power, a lens having positive refractive power and a lens having negative refractive power in this order from the object side, and wherein the second lens group substantially consists of four lenses of a 21st lens having negative refractive power, a 22nd lens having positive refractive power, a 23rd lens having negative refractive power and a 24th lens having negative refractive power in this order from the object side.

2. The variable magnification optical system, as defined in claim 1, wherein an image-side surface of the 22nd lens is convex, and wherein an object-side surface of the 23rd lens is concave.

3. The variable magnification optical system, as defined in claim 1, wherein the 22nd lens and the 23rd lens are cemented together.

4. The variable magnification optical system, as defined in claim 3, wherein the following conditional formula (1) is satisfied:

$$-2.0 < Rc/fw < -0.6 \quad (1),$$ where

Rc: a curvature radius of a cemented surface of the 22nd lens and the 23rd lens, and fw: a focal length of an entire system at the wide-angle end.

5. The variable magnification optical system, as defined in claim 4, wherein the following conditional formula (1') is satisfied:

$$-1.7 < Rc/fw < -0.8 \quad (1').$$

6. The variable magnification optical system, as defined in claim 1, wherein the following conditional formulas (2) and (3) are satisfied:

$$70.0 < v1p \quad (2),$$

and $$34.0 < v2n < 40.0 \quad (3),$$ where v1 p: an average of Abbe numbers of the positive lenses included in the first lens group for d-line, and v2 n: an average of Abbe numbers of the negative lenses included in the second lens group for d-line.

7. The variable magnification optical system, as defined in claim 6, wherein the following conditional formula (2') is satisfied:

$$75.0 < v1p \quad (2').$$

8. The variable magnification optical system, as defined in claim 6, wherein the following conditional formula (3') is satisfied:

$$35.0 < v2n < 39.0 \quad (3').$$

9. The variable magnification optical system, as defined in claim 1, wherein the 24th lens is a meniscus lens with a concave surface facing the object side.

10. The variable magnification optical system, as defined in claim 1,
wherein the 22nd lens is a biconvex lens, and
wherein the 23rd lens is a biconcave lens.

11. The variable magnification optical system, as defined in claim 1, wherein the following conditional formula (4) is satisfied:

$$0.50 < (R21f + R21r)/(R21f - R21r) < 1.30 \quad (4),$$ where

R21 f: a curvature radius of an object-side surface of the 21st lens, and
R21 r: a curvature radius of an image-side surface of the 21st lens.

12. The variable magnification optical system, as defined in claim 11, wherein the following conditional formula (4') is satisfied:

$$0.70 < (R21f + R21r)/(R21f - R21r) < 1.20 \quad (4').$$

13. The variable magnification optical system, as defined in claim 11, wherein the following conditional formula (4") is satisfied:

$$0.75 < (R21f + R21r)/(R21f - R21r) < 1.10 \quad (4'').$$

14. The variable magnification optical system, as defined in claim 1,
wherein the fourth lens group substantially consists of three lenses of a 41st lens having positive refractive power, a 42nd lens having negative refractive power and a 43rd lens having positive refractive in this order from the object side, and
wherein the 41st lens has at least one aspherical surface.

15. The variable magnification optical system, as defined in claim 1, wherein the third lens group includes a lens having positive refractive power and a cemented lens of a lens having positive refractive power and a lens having negative refractive power.

16. An imaging apparatus comprising:
the variable magnification optical system, as defined in claim 1, and
an imaging device that images an image of a subject formed by the variable magnification optical system.

* * * * *